June 18, 1968
H. J. MEPHAM
3,389,030
METHOD OF MANUFACTURE OF PHOSPHOR SCREEN
Filed Oct. 1, 1963
2 Sheets-Sheet 1
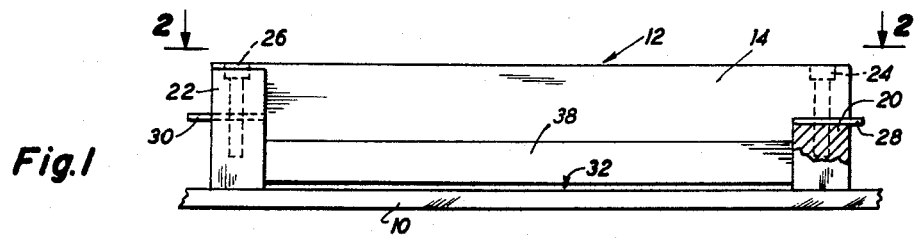
Fig. 1
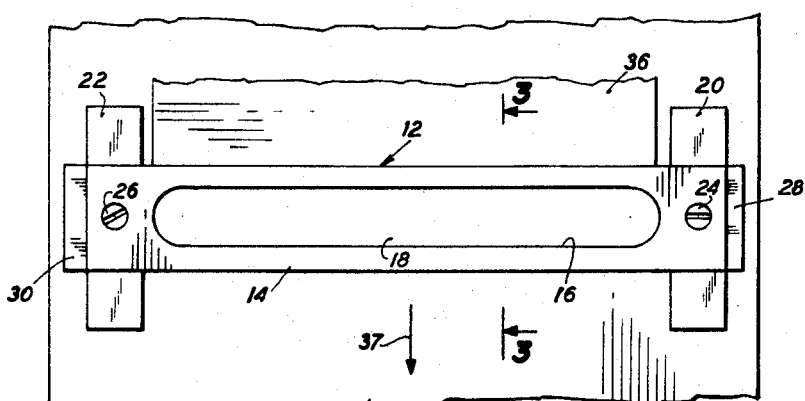
Fig. 2
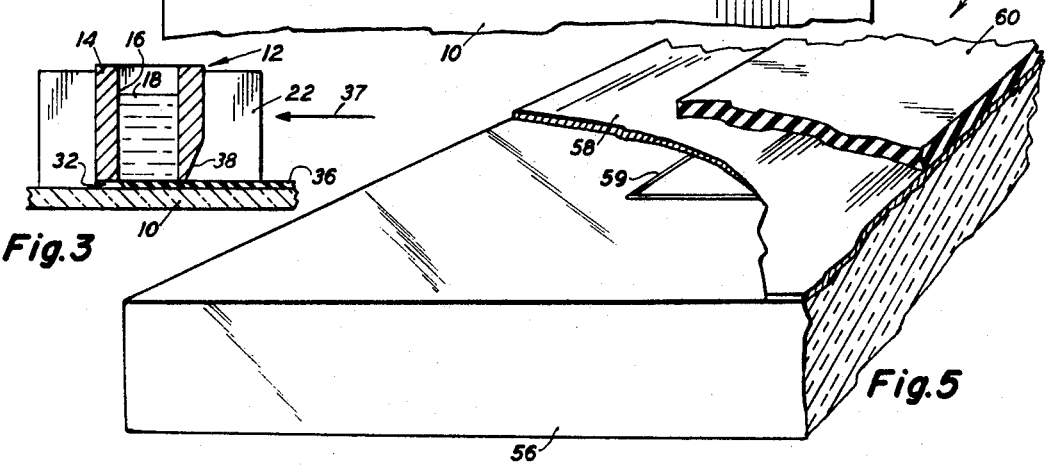
Fig. 3
Fig. 5
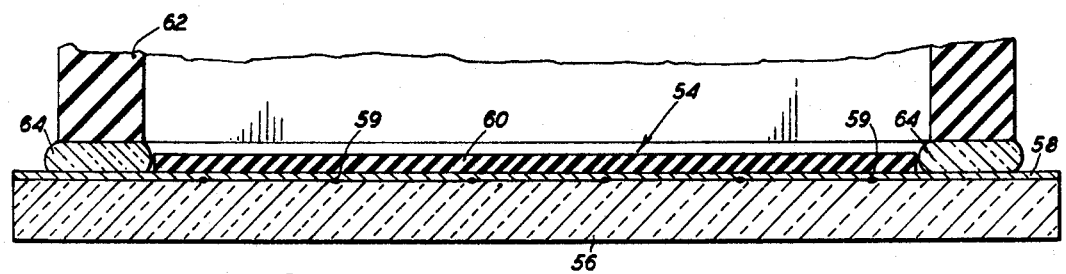
Fig. 6
HERBERT J. MEPHAM
INVENTOR
BY
BUCKHORN, BLORE, KLARQUIST & SPARKMAN
ATTORNEYS United States Patent Office 3,389,030
Patented June 18, 1968

3,389,030
METHOD OF MANUFACTURE OF
PHOSPHOR SCREEN
Herbert J. Mepham, Portland, Oreg., assignor to Tektronix, Inc., Beaverton, Oreg., a corporation of Oregon
Filed Oct. 1, 1963, Ser. No. 313,091
9 Claims. (Cl. 156—67)

The subject matter of the present invention is related in general to phosphor screens and their method of manufacture, and in particular to methods of manufacture of phosphor screens for use in a cathode ray tube in which a self-supporting sheet of phosphor material and organic binder is applied on the face plate of such tube by a decalcomania technique, and is heated in order to remove the organic binder and leave only the phosphor material on such face plate.

The method of manufacture of the present invention is especially useful for making direct viewing storage targets which employ a thin phosphor layer as the secondary emissive storage dielectric of such target of the type shown in copending United States patent application Ser. No. 180,457, now U.S. Patent 3,293,473, filed Mar. 19, 1962, by Robert H. Anderson and entitled "Electron Discharge Display Device." However, the method of the present invention is also applicable to the formation of conventional phosphor screens such as are employed in conventional cathode ray tubes, X-ray image converters and other devices. Direct viewing storage targets made in accordance with the method of the present invention produce light images of higher brightness and better contrast than those made by conventional techniques because the phosphor storage dielectric layer produced by such method contains substantially no binder. Another advantage of the method of the present invention is that the thickness of the phosphor layer of the storage target can be more easily controlled so that it lies within the critical range of thickness over which the phosphor material will store for an indefinite controllable time an electron image produced thereon. As a result, storage targets made in accordance with the present invention have more uniform storage characteristics and there are fewer production rejects.

In addition to the above advantages, it is easier to apply the self-supporting film of phosphor material and organic binder of the present invention to the face plate of a cathode ray tube than it is to apply loose phosphor particles by conventional water settling techniques. In this regard, the film may be easily cut to any shape so that if a rectangular face plate is employed it is a simple matter to make the film conform to this shape. In addition, the edge of the film is sharp after cutting it to the desired shape so that the phosphor of such film is applied to the face plate with a smooth or regular edge of the same thickness as the rest of the phosphor layer, rather than the irregular or feathered edge of varying thickness produced by water settling. Another advantage of one embodiment of the method of manufacture of the present invention is that the film of phosphor material and organic binder can be more easily applied to the face plate of the tube envelope since in some cases the binder may also be a pressure sensitive adhesive. Thus, the method of manufacture of phosphor screens of the present invention is simpler and less expensive than conventional methods and produces phosphor screens having superior characteristics.

It is therefore one object of the present invention to provided improved methods of manufacture of phosphor screens which are simple, fast and inexpensive.

Another object of the invention is to provide an improved method of making a direct viewing storage target including a phosphor screen layer having a substantially uniform thickness within a critical range of thicknesses over which such phosphor layer functions as the secondary emissive storage dielectric of such target, in which substantially all of the binder is removed from the phosphor layer to enable it to produce light image of higher brightness and better contrast.

A further object of the present invention is to provide an improved method of controlling the thickness of phosphor screens more easily and of providing screens of more uniform thickness.

An additional object of the invention is to provide an improved method of manufacture of phosphor screens in which a self-supporting film of phosphor material and organic binder is formed to enable easier application of the phosphor screen to a light transparent support plate.

Still another object of the present invention is to provide an improved method of manufacture of a phosphor screen in any suitable shape, having a sharply defined outline and substantially uniform thickness.

A still further object of the present invention is to provide an improved method of applying a phosphor screen to the face plate of the cathode ray tube in which a film of phosphor particles and organic binder having pressure sensitive adhesive properties is employed so that the film may be more easily held in place on such face plate during the remaining steps of such method.

Other objects and advantages of the present invention will be apparent from the following detailed description of certain preferred embodiments thereof and from the attached drawings of which:

FIG. 1 is a rear view of a knife spreader apparatus which may be used in the method of manufacture of the present invention, with parts broken away for clarity;

FIG. 2 is a top view taken along the line 2—2 of FIG. 1 showing the apparatus in operation;

FIG. 3 is a vertical section view taken along the line 3—3 of FIG. 2;

FIG. 5 is a perspective view of a storage target made in accordance with the method of FIG. 4; and FIG. 6 is a sectional view of the storage target of FIG. 5 shown sealed to the funnel portion of the envelope of a cathode ray tube.

Figure 4:
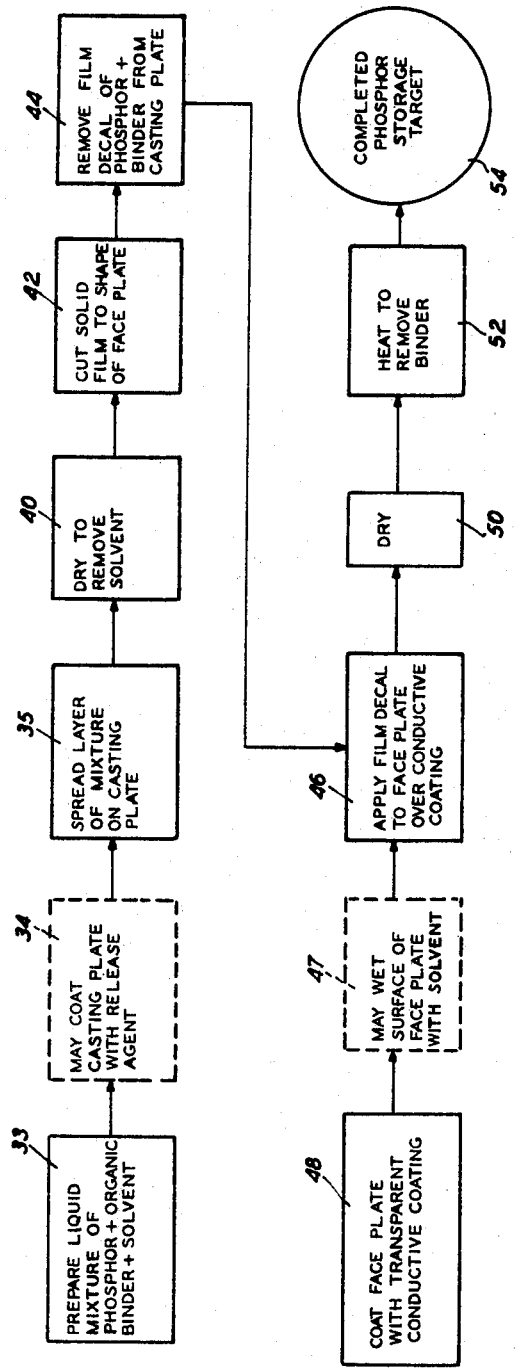
FIG. 4 is a schematic diagram showing different steps in one embodiment of the method of the present invention.

In the preferred embodiment of the method of the present invention a phosphor powder, such as zinc orthosilicate commonly called P1 type phosphor, is mixed with an organic binder which may be the thermoplastic resin sold by E. I. du Pont de Nemours and Company under the name ELVAX 250, dissolved in a suitable solvent, such as toluene, benzene or tetrahydrofuran. This liquid mixture may have the proportions of 50 grams of resin binder to 1 liter of toluene to provide a carrier solution for the phosphor powder which is then mixed in a ratio of 40 grams of phosphor to 100 milliliters of carrier solution. P1 type phosphor is employed as the phosphor material for the storage target because of its excellent electron charge storage and light emission characteristics. However, any other phosphor may be employed, such as lead tungstate, or conventional non-storage phosphors. The resulting liquid mixture is a slurry containing phosphor particles which are suspended in the slurry by stirring to provide a substantially uniform distribution of phosphor particles throughout the liquid mixture.

This liquid mixture of phosphor particles, organic binder and solvent may be spread on the smooth surface of one side of a flat casting plate 10 of glass, plastic or polished metal by means of the knife spreader apparatus 12 shown in FIGS. 1, 2 and 3. In some cases, it may be desirable to apply a suitable release agent, such as sodium n-lauroyl sulfonate, to the surface of the casting plate 10 before coating such plate with a layer of the liquid mixture. However, this release agent is not necessary in most cases. The spreader apparatus 12 includes a blade portion 14 having a reservoir 16 therein containing a small amount of the liquid mixture 18 of phosphor particles, organic binder and solvent. The opposite ends of the blade 14 are supported on U-shaped support blocks 20 and 22 by means of screws 24 and 26 which extend through such blade into threaded holes in the bottom of the notch in each of the support blocks. The bottom surface of each of the support blocks 20 and 22 resting in contact with the casting plate 10 is ground flat so that it can slide over such casting plate. A pair of shims or spacer plates 28 and 30 of the same exact thickness are inserted in the slots in the support blocks 20 and 22, respectively, between such support blocks and the opposite ends of the knife blade 14 to space the lower surface of the edge of the knife blade from the casting plate 10 by a distance 32 which is equal to the thickness of such shims. Thus, different thickness shims may be employed to vary the spacing of the knife blade from the casting plate in order to control the thickness of the layer of liquid mixture coated thereon. Typically the spacing distance 32 is in the neighborhood of .001 to .003 inch.

The steps of one embodiment of the method of the present invention are shown in the block diagram of FIG. 4. After the liquid mixture 18 is prepared, which step is indicated by a solid line block 33 and the release agent applied to the casting plate if desired, indicated by a dotted line block 34, a layer of this liquid mixture is spread onto the casting plate over the release agent as shown by method step block 35. This may be accomplished by moving the spreader knife apparatus 12 in the direction of arrow 37 in FIG. 3 to cause a portion of the pool of the liquid mixture 18 within the knife blade reservoir 16 to flow out of the reservoir onto the surface of the casting plate as a thin layer 36 of liquid mixture whose thickness is substantially uniform and is controlled by the spacing 32 of the blade from the casting plate 10. It should be noted that the blade 14 is provided with a beveled rear edge 38 to prevent a portion of the layer 36 from being removed as the blade is dragged over the layer so that the thickness of such layer remains substantially uniform.

The spreading step 35 of FIG. 4 may also be accomplished merely by dipping the casting plate in a container of liquid mixture 18 and hanging the coated plate by one end. This causes the liquid mixture to run down the plate due to force of gravity so that a layer of liquid mixture is formed on the plate. The thickness of the layer produced by this technique is not uniform all over, it being thinner at the top and thicker at the bottom ends of the plate. However, there is a large central area of substantially constant thickness which can be used for the film decal. After the spreading step 35 the layer of liquid mixture is then allowed to dry on the casting plate 10 at room temperature to remove the solvent and to form a solid film of organic binder and phosphor particles. This drying step is represented by block 40 in FIG. 4.

After the layer of liquid mixture on the casting plate has dried to a solid film by removing the solvent, this solid film of phosphor particles and organic binder may be cut to form a film decal of any desired shape, such as the face plate of the tube envelope to which it is to be attached. This cutting step may be performed while such film is still adhered to the casting plate and is indicated by a method step block 42 in FIG. 4. Next, the film is removed from the casting plate by laying a piece of absorbent paper, such as a paper towel or fine filter paper, which has been soaked with water, over the cut out decal portion of the film for about 1 minute or until such film has softened sufficiently for removal from the casting plate. Then the paper towel is removed and the film decal stripped off of the casting plate due to its adherence to the paper, as indicated in block 44 of FIG. 4 to provide a flexible self-supporting sheet of phosphor material and organic binder. After the removal step, the film decal or sheet is then applied to the light transparent support plate for the phosphor screen, which is shown by a method step block 46. When the organic binder of the film is ELVAX 250 the film decal is pressure sensitive so that it may be easily pressed onto the surface of the support plate which may be the glass face plate of a cathode ray tube and held temporarily by such adhesive. However, it may be necessary to wet the face plate with a solvent, as indicated by block 47, before applying the decal to such face plate when the binder in such decal is not pressure sensitive in order to soften such binder and cause the decal to adhere to the face plate.

When the method of the present invention is used in the manufacture of a storage target, such as that shown in copending United States patent application Ser. No. 180,457, referred to above, the face plate portion of the cathode ray tube envelope can be a flat rectangular plate of glass which is later sealed to a ceramic funnel portion of such envelope, as shown in FIG. 6. This face plate has one side coated with a light transparent electrical conductive coating of tin oxide or other suitable material which is indicated by the method step block 48 of FIG. 4. In this case, the film decal of phosphor and organic binder is cut in a rectangular shape slightly smaller than the face plate and applied over the conductive coating on the face plate in method step 46 of FIG. 4. It is a relatively easy matter to adhere the decal to the face plate when such face plate is a separate member from the funnel portion of the envelope since the decal may be pressed into place by means of the absorbent paper employed to remove it from the casting plate. Great care must be taken so that no air bubbles are left beneath the decal.

However, when a conventional glass envelope is employed having a face plate portion already sealed to a glass funnel portion, it may be necessary to use water inside the envelope to float the film decal into place on the face plate because of the limited access to the interior of the envelope through the small opening in the neck of such envelope. In this case a special sponge coated plate member may be inserted into the tube envelope to assist in pressing the film decal onto the face plate. Another technique which has proved somewhat successful includes the use of an ordinary rubber balloon to press the film decal onto the molded face plate merely by inflating the balloon after it is placed within the funnel portion of the envelope. This latter technique has the advantage that the balloon exerts pressure initially in substantially the center of the film decal and gradually moves outward toward the edge of the decal as the balloon is inflated, so that air bubbles are eliminated from beneath the film decal. It should be noted that the smooth lower surface of the film decal formed by the flat surface of the casting plate, must be placed into contact with the face plate in order to insure sufficient adhesion between such decal and such face plate. The upper surface of the film decal is much rougher than the lower surface and therefore will not stick as readily to the face plate so that the phosphor particles of the decal may not remain adhered thereto after the binder is removed by a subsequent heating step.

Next, the face plate is dried to remove any water left on the film decal adhered to such face plate and this is represented by the drying step block 50 of FIG. 4. This drying step may be carried on at room temperature, or the face plate may be placed in an oven and warmed to about 150° centigrade for a short period of time until the thermoplastic binder of such film softens and adheres better to the face plate. Finally, the face plate is then baked in an oven at a temperature of 400° to 500° centrigrade for about 15 minutes in an oxygen containing atmosphere in order to completely decompose the binder by oxidation without leaving any appreciable ash or other residue, as indicated by the heating step 52. After the organic binder has been removed, the plate is allowed to cool to room temperature and the phosphor particles of the decal remain adhered to the face plate in a thin layer of substantially uniform thickness within the critical range of thicknesses over which the phosphor material will store, for an indefinite controllable time, a charge image produced thereon.

In the case of P1 type phosphor the thickness of the phosphor layer on the face plate may be between approximately .001 to .0025 inch while other types of phosphors have different critical thickness ranges. As discussed in the above-mentioned copending United States patent application Ser. No. 180,457, the storage dielectric 60 is a thin, integral but porous layer of phosphor material having a thickness about one-third the thickness of conventional phosphor screens employed in conventional cathode ray tubes. Thus, while it is very difficult to make the thickness of the phosphor layer of the storage target uniform by conventional methods due to it being so thin, the method of the present invention does this quite easily. As a result, direct viewing phosphor storage targets made in accordance with the present invention have substantially constant thicknesses and more uniform storage characteristics, and emit light images of increased brightness and greater contrast due to the absence of binder material in the phosphor layer.

The completed phosphor storage target, represented by the circle 54 in FIG. 4, is shown in FIG. 5 to include a flat rectangular glass face plate 56 having one side covered by a light transparent electrical conductive coating 58 of tin oxide or other suitable material over intersecting lines 59 of fused glass frit which provide an internal graticule scale for the cathode ray tube. A secondary emissive storage dielectric layer 60 of phosphor material is applied to the face plate over the conductive coating 58 in accordance with the method of the present invention.

As shown in FIG. 6, the storage target 54 of FIG. 5 is secured to a ceramic funnel member 62 forming part of the tube envelope, by means of a suitable glass frit seal 64 between the face plate and such funnel member with at least a portion of the conductive coating 58 extending through such seal to the exterior of the envelope for applying voltages of such coating and for obtaining an electrical readout signal. This envelope construction is discussed in greater detail in the copending United States patent application Ser. No. 180,457, referred to above, and forms no part of the present invention.

Several other organic binders may be employed in addition to the thermoplastic resin designated ELVAX 250. For example, nitrocellulose, and isobutyl methacrylate polymer have been employed with some success. When nitrocellulose is used as the binder it is mixed with a solvent containing equal parts of amyl acetate and ethyl acetate to form a 5% solution of nitrocellulose and solvent. This binder solution is then mixed with the phosphor powder in proportions of 40 grams of powder to 100 milliliters of binder solution. If isobutyl methacrylate polymer is employed as the organic binder this may be mixed with a toluene solvent to form a 5% solution. To this binder solution 40 grams of phosphor powder is added for each 100 milliliters of solution to form the liquid mixture employed. When nitrocellulose or isobutyl methacrylate polymer is employed as the organic binder, the film on the casing plate can be immersed in a container of water until such film can be lifted off the casting plate with a thin knife blade or it slides off such casting plate by itself. The film may then be dried on a piece of absorbent paper to remove any water and cut to the desired shape. Since neither of these binders is pressure sensitive they must be coated with a solvent, such as ethyl alcohol before applying the decal to the face plate. Again, it should be noted that the smooth surface of the film decal must be placed next to the face plate to insure adequate adhesion. The heating cycle for the film decals employing these different organic binders is the same as that previously discussed with reference to ELVAX 250.

It should be noted that several different layers of different liquid mixtures may be applied one on top of the other before the film is removed from the casting plate. Thus, in the case of the extremely thin phosphor screens employed in storage targets it may be necessary to add a backing layer of organic binder to make the film self-supporting. In addition, it is also possible to provide a second different colored phosphor material over the first phosphor by applying a second layer of liquid mixture containing such second phosphor after the first layer has dried to a solid film. In case of a film containing phosphor particles and ELVAX 250 binder, a backing layer of nitrocellulose or isobutyl methacrylate polymer may be spread over the film without changing the setting of the knife blade of the spreader apparatus since such binder solutions have less viscosity than the liquid mixture of phosphor and binder. Of course, it is also possible to include other powders in the organic binder along with the phosphor particles to alter the characteristics of the phosphor screen. In this regard, magnesium oxide particles may be added to the phosphor layer of the storage target to give it better secondary emission characteristics and to increase the "writing speed" of such target.

In addition to the above mentioned method it is also possible to cast the film of phosphor particles and organic binder directly onto the face plate when a separate flat glass plate is employed as such face plate. In this case there would be no necessity to remove the film from the casting plate because the face plate would itself be the casting plate. Also, there would be no need to cut the film to the shape of the face plate or to coat the plate with a release agent. Thus, this alternative method could not be, strictly speaking, called a decalcomania technique. However, some difficulty has been encountered when employing this more simplified method since the first portion of the layer of liquid mixture spread onto the face plate by the spreader knife apparatus is less uniform than the remaining portion of such layer. However, this may be overcome by mounting the face plate with its upper surface coplanar with the upper surface of an additional flat support plate and in contact with the support plate so that such support plate forms in effect an extension of the face plate. If this is done, the spreader knife apparatus may be positioned initially on the support plate and moved for a short distance over such support plate before crossing the face plate so that the initial thick portion of the liquid layer is applied to the support plate, not the face plate, thereby enabling the entire layer coated on the face plate to have substantially the same thickness. It may be necessary to provide a mask around the outer edge of the face plate in the area which is later sealed to the ceramic funnel of the envelope in order to prevent the phosphor particles from sticking to the face plate in this region.

It will be obvious to those having ordinary skill in the art that various changes may be made in the details of the above described preferred embodiments of the present invention without departing from the spirit of the invention. Therefore, the scope of the present invention should only be determined by the following claims.

I claim:

1. A method of making a phosphor screen, comprising the steps of:
   mixing phosphor material with a binder of organic material to form a liquid mixture;
   coating one side of a casting member with a thin layer of said liquid mixture;
   drying said layer to form a solid film of phosphor material and organic binder on said casting member;

removing said film from said casting member to provide a self-supporting element in the form of a single layer of phosphor material and organic binder;

applying said element to a substrate member; and heating the element to decompose the organic binder of said element without any appreciable residue and to leave the phosphor material of said element adhered to said substrate member.

2. A method of making a phosphor screen, comprising the steps of:

mixing phosphor material with a binder of organic material to form a liquid mixture;

coating one side of a flat casting plate with a thin layer of said liquid mixture;

drying said layer to form a solid film of phosphor material and organic binder on said casting plate;

removing said solid film from said casting plate to provide a self-supporting member in the form of a single layer of phosphor material and organic binder mixed substantially uniformly throughout said member;

applying said member to a light transparent support plate; and heating said member while on said support plate to decompose the organic binder of said member without any appreciable residue and to leave the phosphor material of said member adhered to said support plate.

3. A method of making a storage target, comprising the steps of:

applying a light transparent, electrically conductive coating to one side of a glass plate;

mixing phosphor material with a binder of organic material to form a liquid mixture;

coating one side of a casting member with a thin layer of said liquid mixture over said conductive coating so that said layer is of a substantially uniform thickness;

drying said layer to form a solid film of phosphor material and organic binder of substantially uniform thickness on said casting member;

removing said film from said casting member to provide a self-supporting sheet consisting of a single layer of phosphor material and organic binder;

applying said sheet to said one side of said plate over said conductive coating;

heating the sheet while on said plate to decompose the organic binder of said sheet without any appreciable residue and to leave the phosphor material of said sheet adhered to said plate as a layer of phosphor material over said conductive coating, such phosphor layer having an integral thickness within the range of thicknesses over which said phosphor material can store an electron charge produced on said phosphor layer for an indefinite controllable time.

4. A method of making a phosphor screen for a cathode ray tube, comprising the steps of:

mixing phosphor material with a binder of organic material to form a liquid mixture;

coating a flat surface of a casting member with a thin layer of said liquid mixture;

drying said layer to form a solid film of phosphor material and organic binder mixed substantially uniform through said film, on said member;

removing said film from said member to provide a self-supporting sheet of phosphor material and organic binder;

applying said sheet to the inner surface of the face plate portion of the envelope for a cathode ray tube; and heating said sheet while on the face plate to decompose the organic binder of said sheet without any appreciable residue and to leave the phosphor material of said sheet adhered to said face plate.

5. A method of making a phosphor screen for a cathode ray tube, comprising the steps of:

mixing phosphor material with a binder of plastic material to form a liquid mixture;

coating a flat surface of a casting member with a thin layer of said liquid mixture by spreading said liquid mixture to provide said layer with a substantially uniform thickness;

drying said layer to form a solid film of phosphor material and plastic binder of substantially uniform thickness on said member, said film having a smooth side formed adjacent said flat surface of said member;

removing said film from said casting member to provide a self-supporting sheet of phosphor material and organic binder mixed substantially uniformly throughout said sheet;

applying said sheet to the inner surface of the face plate portion of the envelope for a cathode ray tube with the smooth side of said sheet in contact with said face plate; and heating said sheet while on the face plate to decompose the plastic binder of said sheet without leaving any appreciable residue and to leave the phosphor material of said sheet adhered to said face plate.

6. A method of making a phosphor storage target for a bistable storage tube, comprising the steps of:

mixing particles of phosphor material with a binder of organic material and a solvent for said binder to form a liquid mixture;

spreading said liquid mixture with a knife over a flat surface of a rigid casting member to provide a thin layer of said liquid mixture having a substantially uniform thickness;

drying said layer to remove said solvent and to form a solid coating of phosphor material and organic binder of substantially uniform thickness on said member;

removing said coating from said casting member as a self-supporting sheet formed by a single layer of phosphor material and organic binder mixed substantially uniformly throughout said sheet ;

applying said sheet to the inner surface of the face plate portion of the envelope for a storage tube; and heating said sheet while on the face plate to decompose the organic binder of said sheet without leaving any appreciable residue and to leave the phosphor particles of said sheet adhered to said face plate.

7. A method of making an electron storage target having a secondary emissive storage dielectric of phosphor material, comprising the steps of:

mixing phosphor material with a binder of organic material to form a liquid mixture solution;

coating a flat surface of a casting member of glass with a thin layer of said solution having a substantially uniform thickness;

drying said layer to form a solid film of phosphor material and organic binder of substantially uniform thickness on said member, said layer having a smooth side in contact with said casting member;

removing said film from said casting member to provide a self-supporting sheet consisting of a single layer of phosphor material and organic binder mixed substantially uniformly throughout said sheet;

applying a light transparent, electrical conductive coating on one side of a light transparent support plate of electrical insulative material;

applying said sheet to said one side of said plate over the conductive coating with the smooth side of said sheet in contact with said conductive coating; and heating said sheet while on said plate to decompose the organic binder of said sheet without leaving any appreciable residue and to leave the phosphor material of said sheet adhered to said plate in a thin layer having a thickness within the range of thickness over which said phosphor material will store an electron charge image produced thereon.

8. A method of making a direct viewing storage target having a secondary emissive storage dielectric phosphor material, comprising the steps of:

mixing particles of phosphor material with a binder of organic material and a solvent for said binder to form a slurry solution having a substantially uniform distribution of phosphor particles;

coating a flat surface of a rigid casting member with a thin layer of said solution having a substantially uniform thickness;

drying said layer to remove said solvent and to form a solid film of phosphor particles and organic binder of substantially uniform thickness on said casting member;

removing said film from said casting member by applying solvent thereto to provide a self-supporting sheet of phosphor material and organic binder;

applying a light transparent, electrical conductive coating on one side of a light transparent support plate of electrically insulative material;

cutting said sheet to the shape of said plate;

applying said sheet to said one side of said plate over the conductive coating; and heating said sheet on said plate to decompose the organic binder of said film without leaving any appreciable residue and to leave the phosphor particles of said sheet adhered to said plate in a thin layer having a thickness within the range of thickness over which said phosphor can store a charge image produced thereon.

9. A method of making a direct viewing storage target having a secondary emissive storage dielectric of phosphor material, comprising the steps of:

mixing particles of phosphor material with a binder of organic thermoplastic material and a solvent for said binder to form a liquid mixture solution having a substantially uniform distribution of phosphor particles;

coating a flat surface of a rigid casting member with a thin layer of said solution having a substantially uniform thickness;

drying said layer to remove said solvent and to form a solid film of phosphor particles and organic binder of substantially uniform thickness on said member;

cutting said film into a film portion having a shape conforming to that of a face plate for a cathode ray tube;

removing said film portion from said casting member with water to provide a flexible self-supporting sheet of phosphor material and organic binder;

applying a light transparent, electrical conductive coating on one side of the glass face plate;

applying said sheet to said one side of said plate over the conductive coating;

drying said sheet portion to remove the water therefrom; and heating said sheet while on said plate to decompose the organic binder of said sheet without leaving any appreciable residue and to leave the phosphor particles of said sheet adhered to said plate in a thin layer having a thickness over which said phosphor can store a charge image for an indefinite controllable time.

References Cited

UNITED STATES PATENTS

| | | | |
|---|---|---|---|
| 2,311,513 | 2/1943 | Bell | 117—33.5 |
| 2,734,013 | 2/1956 | Myers | 156—67 |
| 2,742,376 | 4/1956 | Larach | 117—33.5 |

DOUGLAS J. DRUMMOND, *Primary Examiner.*

UNITED STATES PATENT OFFICE
CERTIFICATE OF CORRECTION

Patent No. 3,389,030                      June 18, 1968

Herbert J. Mepham

It is certified that error appears in the above identified patent and that said Letters Patent are hereby corrected as shown below:

Column 5, line 67, "casing" should read -- casting --. Column 7, line 48, "a" should read -- an integral --; line 50, cancel "an integral"; line 61, "uniform" should read -- uniformly --.

Signed and sealed this 28th day of October 1969.

(SEAL)
Attest:

Edward M. Fletcher, Jr.
Attesting Officer

WILLIAM E. SCHUYLER, JR.
Commissioner of Patents